No. 892,624. PATENTED JULY 7, 1908.
F. H. RICHARDS.
TYPOGRAPHIC MACHINE.
APPLICATION FILED OCT. 14, 1902.

Witnesses:
H. Jacobs
Fred E. Maynard

Inventor:
F. H. Richards.

No. 892,624. PATENTED JULY 7, 1908.
F. H. RICHARDS.
TYPOGRAPHIC MACHINE.
APPLICATION FILED OCT. 14, 1902.

Witnesses:
H. Jacobs
Fred E. Maynard

Inventor:
F. H. Richards

No. 892,624. PATENTED JULY 7, 1908.
F. H. RICHARDS.
TYPOGRAPHIC MACHINE.
APPLICATION FILED OCT. 14, 1902.

Witnesses:
H. Jacobs
Fred E. Maynard

Inventor:
F. H. Richards.

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

TYPOGRAPHIC MACHINE.

No. 892,624.     Specification of Letters Patent.     Patented July 7, 1908.

Application filed October 14, 1902. Serial No. 127,224.

*To all whom it may concern:*

Be it known that I, FRANCIS H. RICHARDS, a citizen of the United States, residing at Hartford, in the county of Hartford and State of Connecticut, have invented certain new and useful Improvements in Typographic Machines, of which the following is a specification.

This invention pertains to the relationship and organization of various coöperative mechanisms and mechanical devices designed to effect the selective transfer to and the positive location at a given or fixed point of any one of a series of members or devices—such, for instance, as typographic impressors; such members prior to such transfer and location, being, in general, disposed in various positions with respect to such given point.

A mechanical movement embodying the present improvements comprises, ordinarily, supports or carriers, each capable of being angularly adjusted; with which carriers there is combined, mechanism for shifting them, respectively, to the proper angular position to bring the selected device in alinement with the fixed point. In coöperative relation with such carriers and the several devices thereon there will be, ordinarily, suitable and proper mechanism whereby the several supports or carriers, may be, respectively, returned to a certain prime position, relative to the selective mechanism, from which position, as from a common point of departure, said supports may move. Each of these supports carry a member which is adapted to be intercepted and engaged in its path of movement, and, by such interception and engagement, effect such angular adjustment of the support or carrier as may be necessary in order to present the required impression device at the proper point for an impression to be taken therefrom.

Although each support is capable of a movement about an axis, I do not deem it essential that this movement shall be the only one of which it is capable, since the organization will ordinarily be such that there may be imparted to it a compound movement, that is, for instance, an orbital movement, of one or several supports or carriers, as shown herein, or any suitable bodily movement of the members along a predetermined path, in addition to the movement which they have about their own axis.

Besides the elements hereinbefore referred to, however, this invention also pertains to the relationship and organization of other elements, which are designed to effect a selective transfer and positive location of any particular member or device, such, for instance, as a typographic impressor, at a given point, should such member be one in a divided series, of which the several and various members may be distributively mounted upon a plurality of supports or carriers. The organization embodying this particular improvement may render advisable, a distributive division of certain members of the discriminating or selective mechanisms; said members being thus divided into groups, in each of which the members, collectively, may equal, in number, the impressors mounted on a particular correlative carrier. The several groups may be differentiated by their respective locations, or by variation of form, or of dimension, or by any means which will adapt each group, or each single member of a group, to selectively and operatively engage a particular and correlative one of a plurality of interceptive members, which latter, as before mentioned, may, when intercepted, primarily operate to effect such an adjustment of a carrier as may be necessary in order to present an impression device or other cognate member at a given point. The specific selective function of each several member of the whole series of selective mechanisms, relative to its correlative impression device, will, in any event, remain as hereinbefore described; being unaffected by the division of the members of said series into groups, or by any differentiation thereof consistent with this invention.

Various means may be employed for effecting both the rotary and the orbital adjustments of the series of impressors or other devices, and also the proper engagement of the several selective mechanisms; the organization and construction illustrated in the present drawings being one of simple character, and it not being contemplated by such illustration to restrict or confine the application of the present mechanical movement to the embodiment in such illustrated mechanism and mechanical device.

In the drawings forming a part of this specification.

Figures 1, 2:
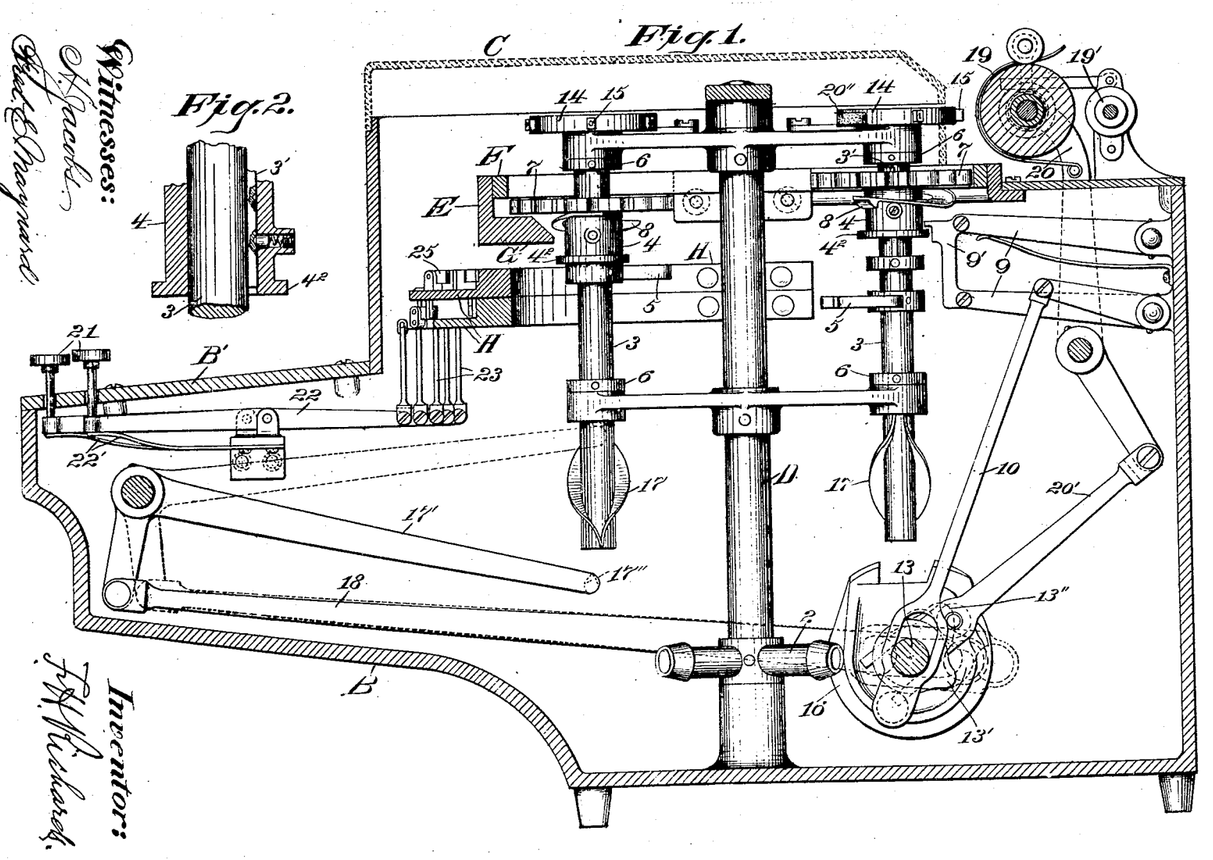
Figure 1 is a vertical longitudinal section of a typographic machine; the section being taken on the line A—A, Fig. 6.
Fig. 2 shows a part of a splined shaft and, in section, a part of the flanged sleeve, and illustrates a method of engaging the latter, by means of a spring operated bolt, in different positions on the former.
Figures 3, 4, 5:
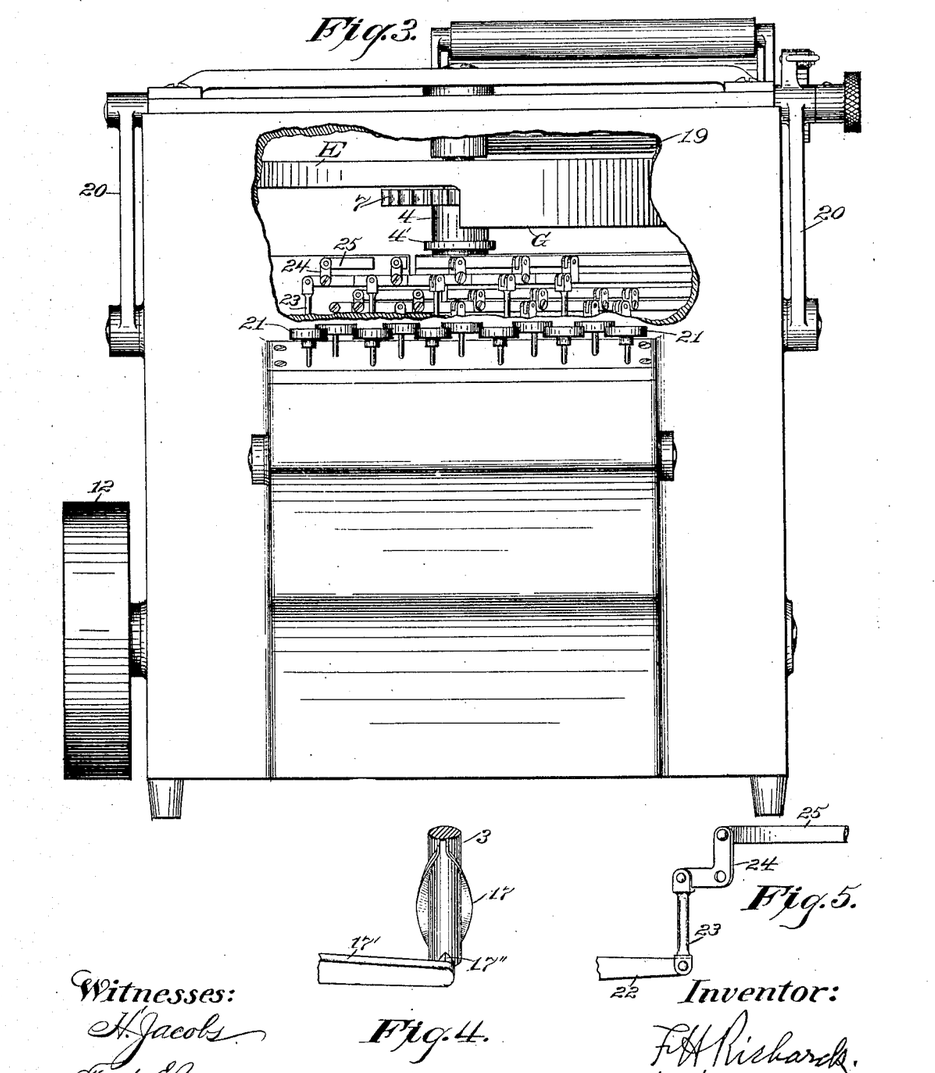
Fig. 3 is a vertical front elevation of the machine, a part of the case being broken away.
Fig. 4 shows, in perspective, the manner in which a cam operator engages a synchronizing cam.
Fig. 5 shows, in elevation and somewhat enlarged, a portion of a train of selective mechanism.
Figure 6:
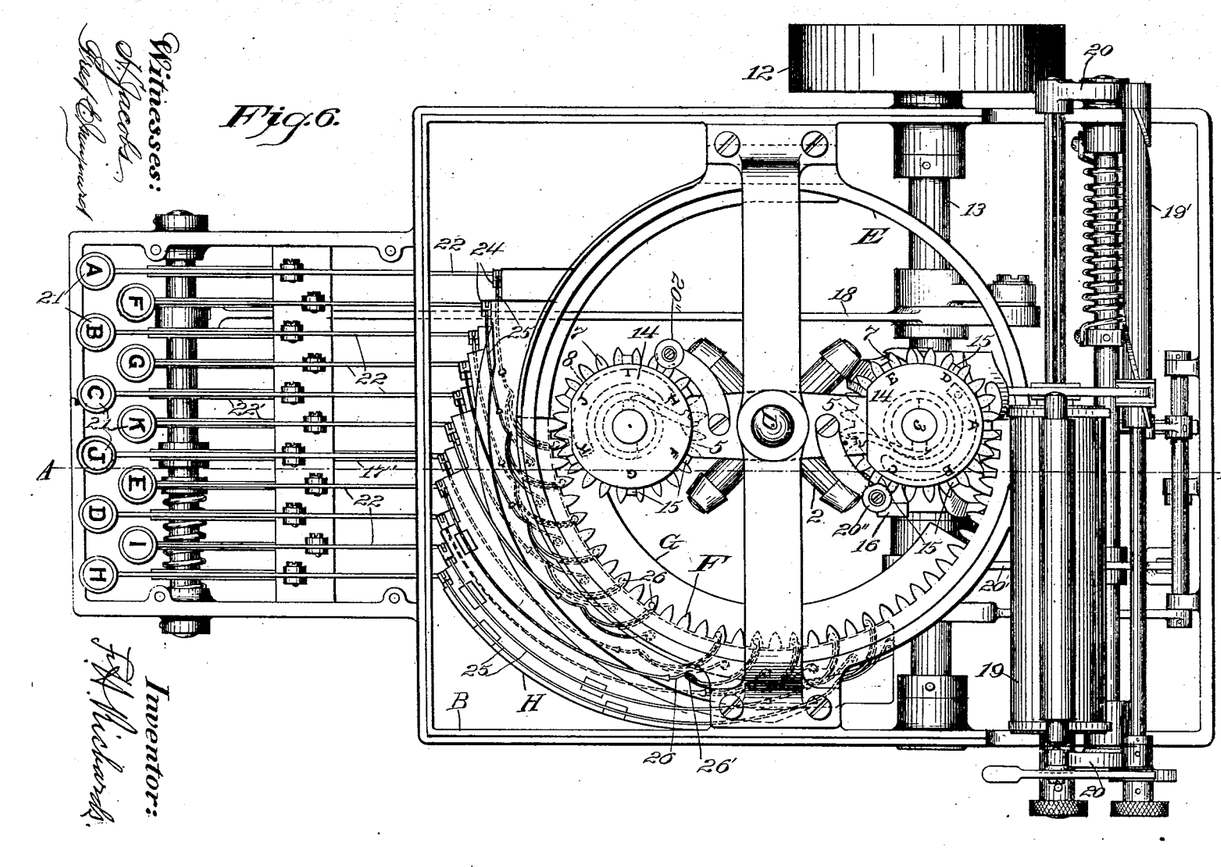
Fig. 6 is a top plan of the machine, the cover being removed.
Figures 7, 8, 9:
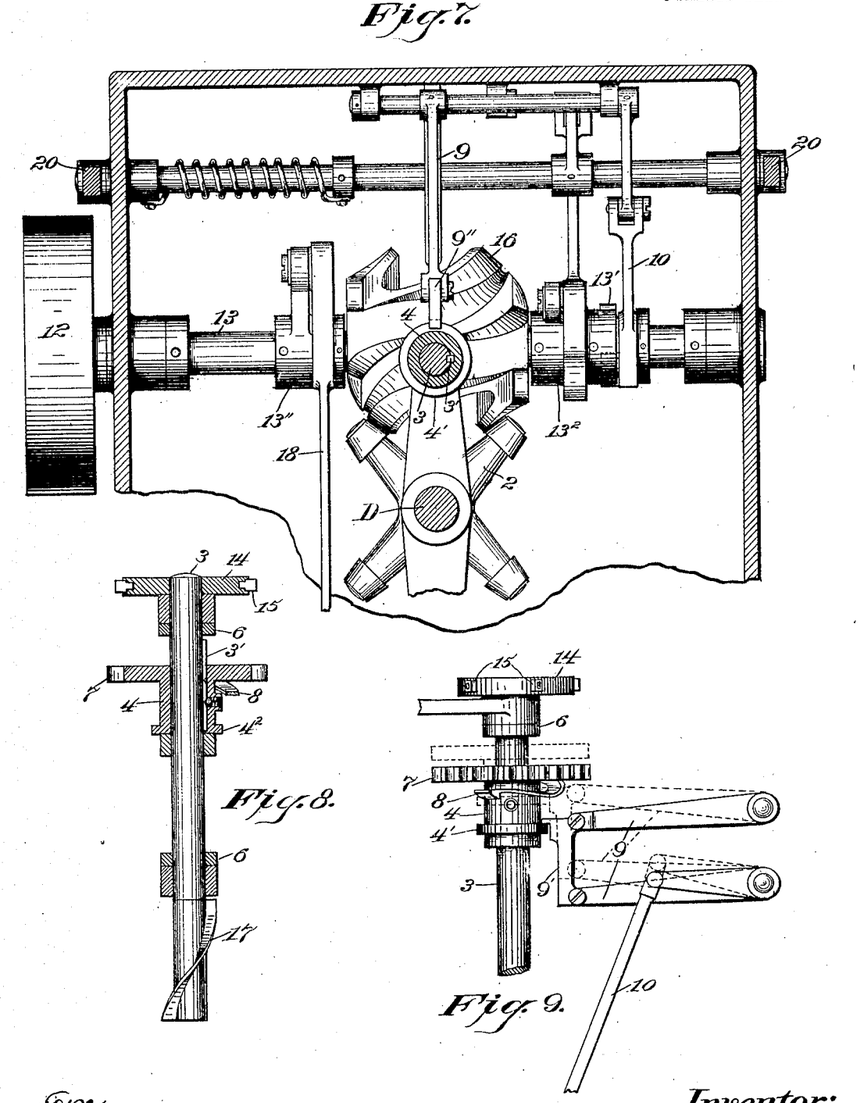
Fig. 7 is a horizontal section of a part of the machine, the section being taken on the line $a-a$, Fig. 1.
Fig. 8 is a vertical elevation of a shaft and synchronizing cam; other parts mounted on the shaft being shown in section through a vertical center line.
Fig. 9 is a vertical elevation of certain parts, and illustrates the operation of the members which disengage the rotating mechanism of an impression device carrier.
Figure 10:
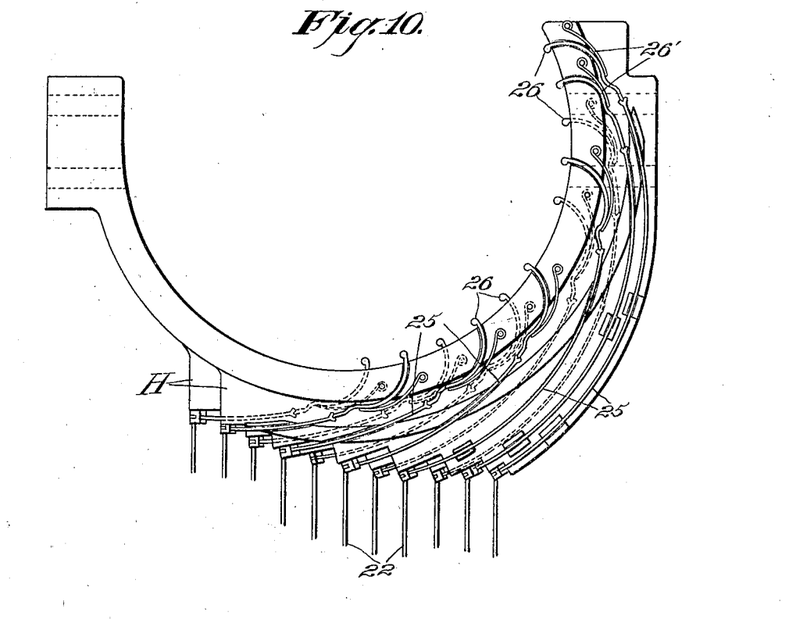
Fig. 10 is a top plan view of a series of trains of selective mechanisms. The terms "zero" and "zero position," used herein indicate that the part referred to is not at the time, functionally engaged.

The mechanism of the device illustrated in the drawings is shown as inclosed within a case B constituting a framework for supporting various elements of the mechanism. A keyboard plate B′ forms a part of the case and also a removable lid or cover C resting upon ledges of the upper part of the case proper.

The turret 2 is shown mounted upon the turret pivot D stepped in a suitable bearing in the casing, and which turret carries two type wheel shafts 3 upon which are mounted type wheels 14 carrying impression devices 15. Each of the type wheel shafts 3 is shown as having a spline 3′ engaging in a sleeve 4 which is fast with a gear wheel 7 adapted when shifted downwardly in the present instance to engage an internal gear segment F and rotate the type wheel as the same is revolved with the turret. The sleeve 4 has a flange $4^2$ which will be engaged by an actuator 9′ carried by a pair of parallel moving levers 9 which are controlled by a link 10 having an eye embracing the drive shaft 13 upon which is mounted a pulley 13′ for engaging said link and rocking the levers 9. The levers when drawn down will draw the pinion 7 into such a position that it will mesh with the gear segment F and when the proper movement has taken place the resetting device 8 will engage a suitable formed cam face G and raise the pinion into an idle or inoperative position. Each of the shafts 3 has fast upon it a starting arm 5 for engagement with selector latches 26 arranged in the path of movement of such arms and adapted when set by means of, in the present instance, keys 21, key-levers 22 controlled by the turning springs 22′ and connected by the links 23 with angle levers 24 and intermediate transmitters 25 directly controlling the latches. Suitable springs 26′ being employed for controlling such latches in their movement, the same as of the keys 21, may be guided in suitable openings in the keyboard B′. The angle or cam plate B is carried in the present instance by an angular member E surrounding and embracing the segmental gear F and secured to the framing. The latches it will be seen are supported in part by a plate H. Each of the shafts 3 has a collar 6 for preventing the upward movement of the shaft and the type wheel; the type wheel being upon one side of the spider carrying the shaft, and such collar upon the opposite side.

It is necessary in the correct operation of the machine that the type wheels be synchronized relatively to the turret and for such purpose the shafts are provided with synchronizing cams 17, which it will be seen unite at a point upon one side of the shaft, pass around the shaft and approach each other, leaving a narrow channel between these through which a stud 17″ carried by a lever 17′ will pass in the upward and downward movement imparted to it by means of a cam 13″ engaging a suitable portion of the link 18 connected in suitable manner with lever 17′. It will be seen that when the stud 17″ engages either of the wings 17 of the cam that it will rotate the shaft 3 until the stud comes opposite the channel or passageway alluded to when it will traverse the same thereby synchronizing the type wheel or setting the same in proper position. The turret is shown as driven from a pulley 12, which may be belted or otherwise connected to some suitable source of power, the driving shaft 13 having an actuator 16 for engaging the arms of the turret and rotating the shaft D. The impression devices are shown as intended to coöperate with some suitable platen, as 19, controlled by a feed roll 19′ in its feed and in its impressing capacity being controlled by a lever 20, link 20′ and cam $13^2$. A suitable inking device 20″ is provided for engaging the device or impression devices at proper periods in their rotation.

In the mechanism illustrated herein, the latches 26, and intermediate transmitters 25, are shown divided into groups, severally disposed on the separate operative planes, respectively, on which the starting arms 5, are severally mounted and rotated. The inclusion in said groups, of the intermediate transmitters 25, is purely one of convenience, however, as the object of the before-mentioned division into groups pertains to an arrangement of the intercepting contact parts of the several latches in a group on a common operative plane with a correlative starting arm. On the carriers 14, 14, collectively, is mounted a series of differentially designed impression devices 15, the latter being distributively divided into two several groups, one group being mounted on each carrier. The members in each group of impression devices need not necessarily be equal in number, with those in the other group; but should, however, be equal in number to the members in the group of correlative selective mechanisms. In this form of construction, the length of each link 23, will be such as to adapt it for use relatively with an angle lever 24 in the respective group of selective devices of which it may be a member. This arrangement on several planes, of a plurality of starting arms and of groups of interceptive contact members or latches, allows the use of a greater number of impression devices relative to carriers of given dimensions, or conversely, allows the use of carriers of less dimensions for a series consisting of a given number of impression devices, than would be possible were all of the starting arms and interceptive members or latches mounted on one and the same operative plane. The several groups of impression devices on the respective carriers may each differ from the other, either wholly or in part, in the design or character formed on each member. Should such difference be in part, only, it might, wherever made, relate, preferably, to the less frequently used impression devices; as thereby the others would, because of the more frequently occurring possibilities for an engagement of a correlative starting arm, be rendered more frequently available for use. To this end, the several trains of selective mechanism, respectively correlative with such more frequently used devices, may respectively include latches severally arranged to intercept a plurality of starting arms, on whatever operative plane located. Or a like result may be effected by the operation of any one of several selective mechanisms which may severally be wholly separate and disconnected, one from the others.

The selective mechanism thus described, may be operated as follows:—A key 21, being depressed, operates its connected lever 22, link 23 and angle-lever 24; the latter, in turn, operating the connected intermediate transmitter 25, and, thereby, the contacting latch 26, which, by reason of the directional movements of these several members, is definitely positioned to intercept its specifically correlative starting arm 5. If, now, the turret 2 be rotated by the actuator 16, in a normal direction, namely, left-handed, or from North to West, a correlative starting arm 5, will be intercepted by the previously operated latch 26, and such engagement will cause the partial rotation of the sleeve 4, which by means of a spline 3', will partially rotate the shaft 3, and an impression device carrier 14, mounted on the latter. The partial rotation, as stated, of a sleeve 4, causes the beveled end of an elevator 8, mounted thereon, to become engaged with the beveled edge of the curved angle-plate G, and by the combined rotating and sliding motions of the one inclined plane upon the other, the sleeve 4 is elevated sufficiently to cause a gear wheel 7, mounted thereon and rotating therewith, to engage and mesh with the internal gear segment F, such engagement, combined with continued rotation of the turret 2, being thus made to impart an orbitally rotative motion to the shaft 3, and to all parts mounted thereon. The key 21, key-lever 22, link 23, angle-lever 24 and intermediate transmitter 25, will all be returned to their zero positions by a spring 22', which operatively engages the key-lever 22; but the latch 26, being only contactually engaged by the transmitter 25, remains for a time in the same position; being frictionally retained therein by a spring 26', which impinges against a curved face on the latch 26. The return of the latch 26, to a zero position, is eventually effected by a cam-like operation of the free end of the starting arm 5, which has previously been engaged by said latch, but is then operated by means of the engagement of the gear-wheel 7, in the internal gear segment F.

The resultant effect of the predescribed operation of the selective mechanism, is the presentation of a preselected impression device at a normal position for an impression to be taken therefrom; the latter operation being effected by the operation of the drive-shaft 13, the cam 13", mounted thereon, the link 20', on which a cam roller is mounted, the impressing lever 20, and the platen 19, operated by the lever 20. The impression will be made when the turret 2, and shaft 3 are at rest; the actuator 16, being then at a dead point, as may be found more fully set forth in my application filed January 13, 1902; which on December 31, 1907 matured into United States Letters Patent No. 875,212, wherein, also, may be found complete descriptions of all members, and of the functions thereof shown or mentioned in this application, but not fully described herein. The impression having been made, as hereinbefore set forth, the cam 13' on the shaft 13, by means of a cam roller mounted on the link 10, so operates the latter, the duplex lever 9 and a disengaging member 9", pivoted to the latter, and engageable with the flanges 4², on the previously operated sleeve 4, as to depress the latter and, thereby disengage the gear wheel 7 from the internal gear segment F; the opposite shaft 3, and the members mounted thereon being, meanwhile, synchronized by a cam 17 and its operative mechanism.

Having described my invention, I claim—

1. The combination of a plurality of impression devices; a plurality of carriers for carrying the impression devices and which are intermittently movable in an orbital path; a plurality of driven members respectively mounted with the several carriers; and a plurality of selective mechanisms, respectively engageable with the several driven members.

2. The combination of a plurality of impression devices divided into groups; a plurality of driven members severally rotatable with the respective groups and intermittently movable therewith in an orbital path; and a plurality of selective mechanisms, each member thereof being, respectively, engageable with a single driven member.

3. The combination of a series of impression devices divided into groups; a plurality of driven members severally rotatable with the respective groups and intermittently movable therewith in an orbital path; and a plurality of groups of selective mechanisms for engaging the driven members, the selective mechanism of each group being engageable with a single driven member.

4. The combination of a plurality of impression devices divided into separate groups; a plurality of driven members, severally and variably rotatable with each respective group and intermittently movable therewith in an orbital path; and a plurality of groups of selective mechanisms for engaging the driven members, the selective mechanisms of each group, being engageable with a single driven member.

5. The combination of a series of impression devices divided into separate groups; a plurality of driven members, severally and variably rotatable with each respective group and intermittently movable therewith in an orbital path; and a plurality of selective mechanisms, each member thereof being, respectively, engageable with a single driven member.

6. The combination of a plurality of groups of differential impression devices mounted on carriers adapted for intermittent rotary and intermittent orbital movement; a plurality of driven members, each, respectively, rotatable with a carrier; and a plurality of selective mechanisms, each member thereof being, respectively, engageable with a single driven member.

7. The combination of a plurality of groups of differential impression devices mounted on carriers adapted for intermittent rotary and intermittent orbital movement; a plurality of driven members severally and variably rotatable with each respective group; and a plurality of groups of selective mechanisms, each group, respectively, engageable with a single driven member.

8. The combination of a plurality of impression devices divided into groups; a plurality of carriers, severally serving as mounts for said groups respectively and which are adapted for intermittent rotary and orbital movement; a plurality of driven members severally rotatable with the respective carriers; a driving member engageable with and operating the several driven members; and a plurality of groups of selective mechanisms; each group, respectively, engageable with a single driven member.

9. The combination of a plurality of impression devices divided into groups; a plurality of carriers, severally serving as mounts for said groups respectively and which are adapted for intermittent rotary and orbital movement; a plurality of driven members, severally variably rotatable with the respective carriers; a driving member engageable with and operating the several driven members; and a plurality of groups of selective mechanisms; each group, respectively, engageable with a single driven member.

10. The combination of a plurality of impression devices divided into groups; a plurality of carriers severally serving as mounts for said groups respectively and which are adapted for intermittent rotary and orbital movement; a plurality of driven members severally rotatable with the respective carriers; a driving member engageable with and operating the several driven members; and a disengaging actuator engageable with the driven members in turn, and disengaging the driven members from the driving member.

11. The combination of a plurality of impression devices divided into groups; a plurality of carriers severally serving as mounts for said groups respectively and which are adapted for intermittent rotary and orbital movement; a plurality of driven members severally variably rotatable with the respective carriers; a driving member engageable with and operating the several driven members; and a disengaging actuator engageable with the driven members in turn, and disengaging the driven members from the driving member.

12. The combination of a plurality of impression devices divided into groups; a plurality of carriers severally serving as mounts for said groups respectively and which are adapted for intermittent rotary and orbital movement; a plurality of driven members severally rotatable with the respective carriers; a driving member engageable with and operating the several driven members; a disengaging actuator engageable with the driven members in turn, and disengaging the driven members from the driving member; and a plurality of groups of selective mechanisms, each group, respectively, engageable with a single driven member.

13. The combination of a plurality of impression devices divided into groups; a plurality of carriers severally serving as mounts for said groups respectively and which are adapted for intermittent rotary and orbital movement; a plurality of driven members severally variably rotatable with the respective carriers; a driving member engageable with and operating the several driven members; a disengaging actuator engageable with the driven members in turn, and disengaging the driven members from the driving member; and a plurality of groups of selective mechanisms for engaging the driven members, the selected mechanisms of each group, engageable with a single driven member.

14. The combination of a series of intermittently orbitally and rotatably movable, differential impression devices divided into independently operative groups; a plurality of driven members severally variably operating said groups respectively, and equal in number thereto; a series of selective mechanisms divided into groups equal in number to said groups of impression mechanisms, and severally variably and interceptively engageable with the driven members; a driving member variably and intermittently engaging the several driven members; a reciprocating member separately engaging said driven members and disengaging said driven members from the driving member, synchronously with intermissions in the orbital movements of the several groups of impression devices; a plurality of cams severally mounted and rotatable with the respective driven members, each cam being formed with two faces branching in continued peripherally opposite directions from an acute angle; and a reciprocatable cam operator engageable with any one of said cams at any point in the operation of its connected driven member and operating said cam and its connections to effect a prime adjustment of the driven member relative to the series of selective mechanisms.

15. The combination with a plurality of carriers each having a shaft, of a plurality of impression devices mounted on each carrier, mechanism for shifting the same toward and away from the working point and for temporarily arresting the motion of the device when the same is at the working point, and means on each shaft for returning the impression device to a fixed predetermined position upon its withdrawal from the working point, and comprising a pair of wing cams diverging from a common point and then converging toward each other and continuing in a channel, a reciprocatory member for engaging one of said cam wings and angularly shifting said shaft and traversing said channel, and means for reciprocating said member.

16. The combination with a plurality of carriers each having a shaft, of a plurality of impression devices mounted on each carrier, mechanism for shifting the same toward and away from the working point and for temporarily arresting the motion of the device when the same is at the working point, and a synchronizing device for returning the impression device to a fixed predetermined position upon its withdrawal from the working point and embodying a pair of wing cams and an engaging member therefor.

17. The combination with a plurality of carriers each having a shaft, of a plurality of impression devices mounted on each carrier, mechanism for shifting the devices toward and away from the working point and for temporarily arresting the motion of a selected impression device when the same is at the working point, and means embodying a pair of wing cams divergent from a common point for returning said selected device to a fixed predetermined position upon its withdrawal from said working point, and while the other of said carriers is at the working position.

18. The combination with a plurality of carriers each having a shaft, of a plurality of impression devices mounted on each carrier, mechanism for shifting the devices toward and away from the working point and for temporarily arresting the motion of a selected impression device when the same is at the working point, and a synchronizing device embodying divergent winged cams for rotating said selected device into a fixed predetermined position upon the withdrawal from said working point of the carrier.

19. The combination with a plurality of carriers each having a shaft, of a plurality of impression devices mounted thereon, mechanism for actuating the carrier to shift the impression devices thereon toward and away from the working point and for arresting the motion of the carrier when a selected device is at the working point, and a reciprocatory member and divergent winged cams on said shafts for returning said selected device to a fixed predetermined position upon the withdrawal of said carrier from said working point.

20. The combination with a plurality of carriers, of a plurality of impression devices mounted thereon mechanism for actuating the carrier to shift the impression devices thereon toward and away from the working point and for arresting the motion of the carrier when a selected device is at a working point, and a synchronizing device for returning said selected device to a fixed predetermined position upon the withdrawal of the carrier from said working point embodying a pair of winged cams and an engaging member therefor.

21. The combination with a plurality of carriers adapted for independent rotary movements and for orbital movement past the working point, of a plurality of impression devices mounted on each carrier, mechanism for causing said carriers to move along their orbital path and for arresting the carrier supporting the selected impression device when such device is at the working point, selective mechanism for selecting one impression device to the exclusion of the others, and a synchronizing device for returning the selected carrier to a predetermined rotarial position.

22. The combination with a plurality of carriers adapted for independent rotary movements and for orbital movement past the working point, of a plurality of impression devices mounted on each carrier, mechanism for causing said carriers to move along their orbital path and for arresting the carrier supporting the selected impression device when such device is at the working point, selective mechanism for selecting one impression device to the exclusion of the others and a synchronizing device comprising a synchronizing arm and inclined working faces moving in unison with the carriers.

23. The combination with a turret, of a plurality of impression device carriers mounted thereon, mechanism for imparting an intermittent movement to said turret to bring each impression device carrier in succession to the working point and then causing the motion of the turret to be temporarily suspended, a starting arm rotatable in unison with each impression device carrier, a selective mechanism for engaging a predetermined starting arm and thereby initiating the rotary movement of the selected impression device carrier prior to the arrival thereof at the working point, and a synchronizing device coöperative with each impression device carrier to return said carrier to a predetermined rotarial position, when the carrier shall have been withdrawn from the working point.

24. The combination with a rotary turret, of a plurality of rotatable impression device carriers mounted thereon, mechanism for imparting an intermittent rotary movement to said turret to bring each impression device carrier in succession to the working point, a starting arm moving in unison with each impression device carrier, selective mechanism for initiating the rotary movement of a selected carrier, and a synchronizing device comprising an inclined working surface moving in unison with each impression device carrier, and a synchronizing arm coöperative with said inclined surface when the selected impression device carrier shall have been withdrawn from the working point.

25. The combination with an intermittently rotatable turret, of a plurality of impression device carriers whose shafts are mounted on said turret, a starting arm extending from each of said shafts, selective mechanism for engaging with the respective starting arms to the exclusion of the others, driving means for continuing the rotary movement of a selected impression carrier subsequent to the initiation of such movement by its engaged starting arm, means for throwing said driving means out of gear when the selected carrier has been withdrawn from the working point, and a synchronizing device for thereupon returning such carrier to a predetermined rotarial position.

26. The combination with a rotatable turret, of a plurality of impression device carriers whose shafts are mounted on said turret, mechanism for imparting an intermittent motion to said turret to bring each carrier in succession to the working point, an axially movable gear mounted on each impression device carrier shaft, a fixed driving gear, starting means comprising a starting arm, and selective mechanism for initiating the rotary movement of an impression device carrier prior to its arrival at the working point, cam devices for shifting the said gear of each selected carrier axially upon the initiation of the rotary movement thereof, a cam-operated retractor for disengaging the engaged gear when the selected impression device carrier shall have been withdrawn from the working point, and a synchronizing device for thereupon returning said carrier, and its shaft to a predetermined rotarial position.

27. The combination with a carrier adapted for rotary movement and for orbital movement past a working point, of impression devices mounted on said carrier, mechanism for causing said carrier to move along its orbital path and for arresting the carrier supporting the selector impression device when such device is at the working point, selective mechanism for selecting one impression device to the exclusion of the others, and a synchronizing device comprising a synchronizing member, and inclined working elements working in unison with the carrier.

28. The combination with a rotary turret, of a plurality of impression device carriers whose shafts are mounted on said turret, a starting arm extending from each of said shafts, selective mechanism for engaging with the respective starting arms to the exclusion of the others, driving means for continuing the rotary movement to the selective carriers subsequent to the initiation of such movement by its engaging the starting arm, means for throwing the driving means out of gear when the selected carrier has been withdrawn from the working point, and a device for thereupon returning such carrier to a predetermined rotarial position.

29. The combination with an intermittently rotatable turret, of a plurality of rotatable impression device carriers mounted thereon, mechanism for imparting an intermittent rotary movement to said turret to bring each device carrier in the working point, a starting arm moving in unison with each impression device carrier, selective mechanism for initiating the rotary movement of the selected carrier, and a device comprising an inclined working surface movable in unison with each impression device carrier, and an arm coöperating with said inclined surface when the selected impression device carrier will have been withdrawn from the working point.

30. The combination with a rotary turret, a starting arm movable in unison therewith, selective mechanism for initiating the movement, a device comprising an inclined working surface moving in unison with an impression device carrier, and an arm coöperative with said inclined surface when the selected impression device carrier shall have been withdrawn from the working point.

FRANCIS H. RICHARDS.

Witnesses:
 FRED. J. DOLE,
 JOHN O. SEIFERT.